(12) United States Patent
Beerens et al.

(10) Patent No.: US 9,492,896 B2
(45) Date of Patent: Nov. 15, 2016

(54) DEVICE FOR POSITIONING MULTIPLE FUNCTION ELEMENTS

(71) Applicant: Mahle International GmbH, Stuttgart (DE)

(72) Inventors: Christoph Beerens, Stuttgart (DE); Antonio Menonna, Ditzingen (DE); Lothar Pfizenmaier, Lichtenwald (DE); Roland Schacherer, Geisingen (DE)

(73) Assignee: Mahle International GmbH (DE)

( * ) Notice: Subject to any disclaimer, the term of this patent is extended or adjusted under 35 U.S.C. 154(b) by 184 days.

(21) Appl. No.: 14/157,240

(22) Filed: Jan. 16, 2014

(65) Prior Publication Data

US 2014/0196552 A1  Jul. 17, 2014

(30) Foreign Application Priority Data

Jan. 17, 2013  (DE) .................. 10 2013 200 638

(51) Int. Cl.
*B23P 11/02* (2006.01)
*B21K 1/12* (2006.01)
(Continued)

(52) U.S. Cl.
CPC .............. *B23P 11/025* (2013.01); *F01L 1/047* (2013.01); *F16D 1/0858* (2013.01); *F16H 25/16* (2013.01); *F16H 53/025* (2013.01); *B23P 2700/02* (2013.01); *F01L 2001/0471* (2013.01); *F01L 2103/01* (2013.01); *F16B 4/006* (2013.01); *Y10T 29/49293* (2015.01); *Y10T 29/49826* (2015.01);
(Continued)

(58) Field of Classification Search
CPC ... B23P 11/025; B23P 11/02; B23P 2700/02; F16H 53/025; F01L 2001/0471; F01L 2001/047; Y10T 29/49865; Y10T 29/49293; Y10T 29/49286
See application file for complete search history.

(56) References Cited

U.S. PATENT DOCUMENTS 3,999,277 A * 12/1976 Hamada .................... F16D 1/06
                                                                29/447
4,337,572 A * 7/1982 Takahashi ............... F01L 1/047
                                                                29/241
(Continued)

FOREIGN PATENT DOCUMENTS

DE       10225688 A1    12/2003
DE  102007056769 A1 *  6/2008  ............ B23P 11/005
(Continued)

OTHER PUBLICATIONS

Machine English translation of DE 102011001499, published Aug. 30, 2012.*
(Continued)

*Primary Examiner* — Essama Omgba
(74) *Attorney, Agent, or Firm* — Fishman Stewart PLLC

(57) ABSTRACT

A device for positioning multiple function elements having a recess for receiving a shaft in a predetermined angle position may include multiple mountings for receiving the function elements. The mountings may be equipped with a molding establishing the predetermined angle position of the respective function element corresponding to the angle position on the shaft. The mountings may be positioned such that the recesses of the function elements lie on a common straight line. The mountings may be arranged vertically on top of one another so that the common straight line runs in vertical direction. A vertically moveable guide carriage for the shaft may be provided for joining the shaft with the function elements in vertical direction.

21 Claims, 3 Drawing Sheets

(51) Int. Cl.
*B21D 53/84* (2006.01)
*F16H 25/16* (2006.01)
*F01L 1/047* (2006.01)
*F16D 1/08* (2006.01)
*F16H 53/02* (2006.01)
*F16B 4/00* (2006.01)

(52) U.S. Cl.
CPC ..... *Y10T 29/49865* (2015.01); *Y10T 29/49867* (2015.01); *Y10T 29/53439* (2015.01); *Y10T 74/18296* (2015.01)

(56) References Cited

U.S. PATENT DOCUMENTS

| | | | | |
|---|---|---|---|---|
| 4,597,365 | A * | 7/1986 | Madaffer | F01L 1/047 123/90.6 |
| 4,604,510 | A * | 8/1986 | Laughlin | C21D 9/30 148/575 |
| 4,616,389 | A * | 10/1986 | Slee | B23P 11/025 29/447 |
| 4,738,012 | A * | 4/1988 | Hughes | B21D 53/84 29/421.1 |
| 4,750,250 | A * | 6/1988 | Maus | B21D 39/04 29/421.1 |
| 4,763,503 | A * | 8/1988 | Hughes | B21D 53/84 164/342 |
| 4,816,633 | A * | 3/1989 | Mucha | H05B 6/06 219/650 |
| 4,897,518 | A * | 1/1990 | Mucha | H05B 6/06 219/639 |
| 5,054,182 | A * | 10/1991 | Riemscheid | B23P 19/04 29/281.5 |
| 5,097,582 | A * | 3/1992 | Kreher | B21D 53/845 269/48.1 |
| RE33,868 | E * | 4/1992 | Maus | B21D 39/04 29/523 |
| 6,473,964 | B1 * | 11/2002 | Anderson | B22F 7/062 29/447 |
| 6,993,837 | B2 * | 2/2006 | Merz | B23K 11/11 29/505 |
| 7,096,575 | B2 * | 8/2006 | Asbeck | B21D 26/033 29/523 |
| 7,721,432 | B2 * | 5/2010 | Burgler | B23P 9/02 198/346.3 |
| 7,775,186 | B2 * | 8/2010 | Sakurai | B21D 53/845 123/90.16 |
| 8,720,055 | B2 * | 5/2014 | Flender | F01L 1/047 123/90.17 |
| 9,009,963 | B2 * | 4/2015 | Grunwald | F16H 53/025 123/90.17 |
| 9,309,953 | B2 * | 4/2016 | Menonna | F16H 25/08 |
| 2006/0005385 | A1 * | 1/2006 | Quaas | B23P 11/025 29/888.08 |
| 2008/0289592 | A1 * | 11/2008 | Flender | F16C 35/077 123/90.6 |
| 2012/0131790 | A1 * | 5/2012 | Schacherer | B23B 31/1179 29/557 |
| 2012/0255170 | A1 * | 10/2012 | Flender | F16C 35/077 29/888.1 |
| 2014/0251037 | A1 * | 9/2014 | Menonna | F16H 25/08 74/55 |
| 2015/0360331 | A1 * | 12/2015 | Beerens | F16H 25/16 29/447 |

FOREIGN PATENT DOCUMENTS

| | | | | |
|---|---|---|---|---|
| DE | 102007056638 A1 | | 5/2009 | |
| DE | 102008064194 A1 | | 7/2010 | |
| DE | 102009060350 A1 | | 6/2011 | |
| DE | 102011001499 B3 * | | 8/2012 | ............ B23P 11/025 |
| EP | 2777868 A1 * | | 9/2014 | ............ F16H 25/08 |
| JP | 11036832 | | 2/1999 | |
| JP | 2000-061749 A | | 2/2000 | |
| JP | 2000-073709 A | | 3/2000 | |
| JP | 2000073709 A * | | 3/2000 | |
| JP | 2003-211332 A | | 7/2003 | |
| JP | 2003-227560 A | | 8/2003 | |
| WO | WO 8804719 A1 * | | 6/1988 | ............ B23P 19/04 |
| WO | WO 2011076330 A1 * | | 6/2011 | ............ B23P 11/025 |
| WO | WO 2014101991 A2 * | | 7/2014 | ............ F01L 1/047 |

OTHER PUBLICATIONS

English abstract for DE-1022009060350..
German Search Report for DE-102013200638.1, dated Nov. 11, 2013.
English abstract for DE-10225688.
English abstract for JP2000-61749.
English abstract for JP2000-73709.
English abstract for JP2003-211332.
English abstract for JP2003-227560.
English abstract for JP11036832.
European Search Report EP-13199076 Apr. 14, 2014.

\* cited by examiner

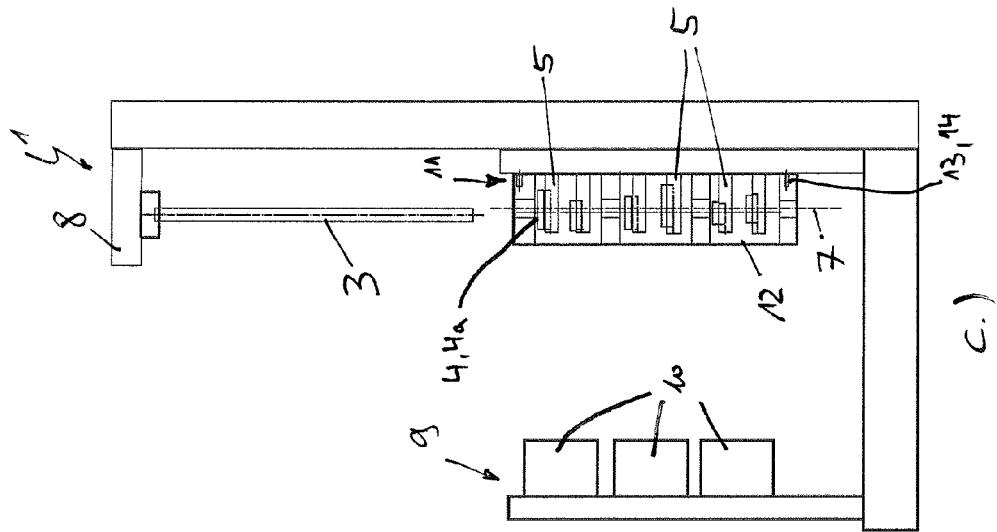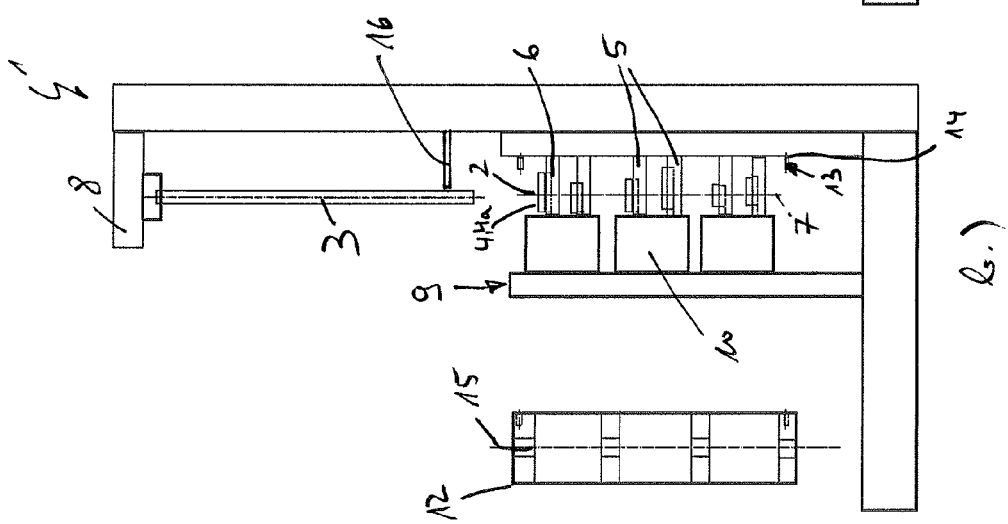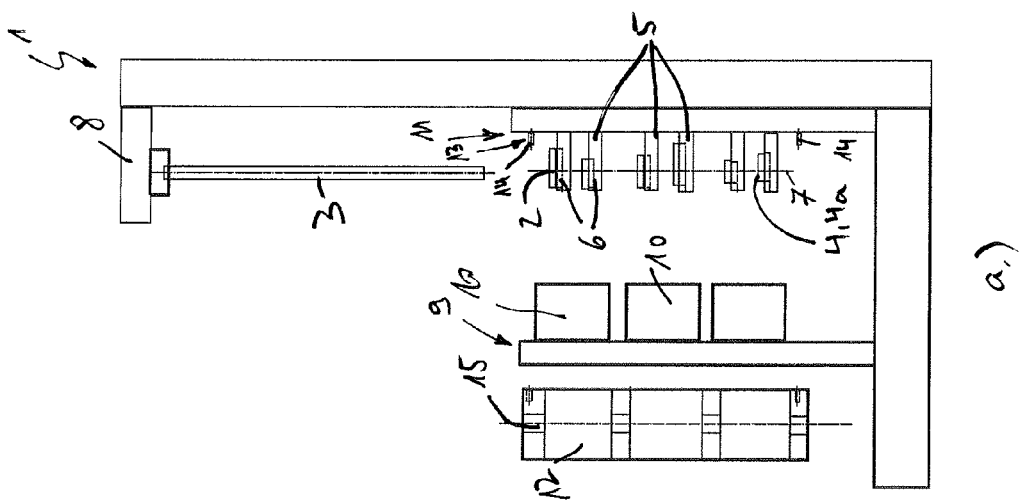
Fig. 1

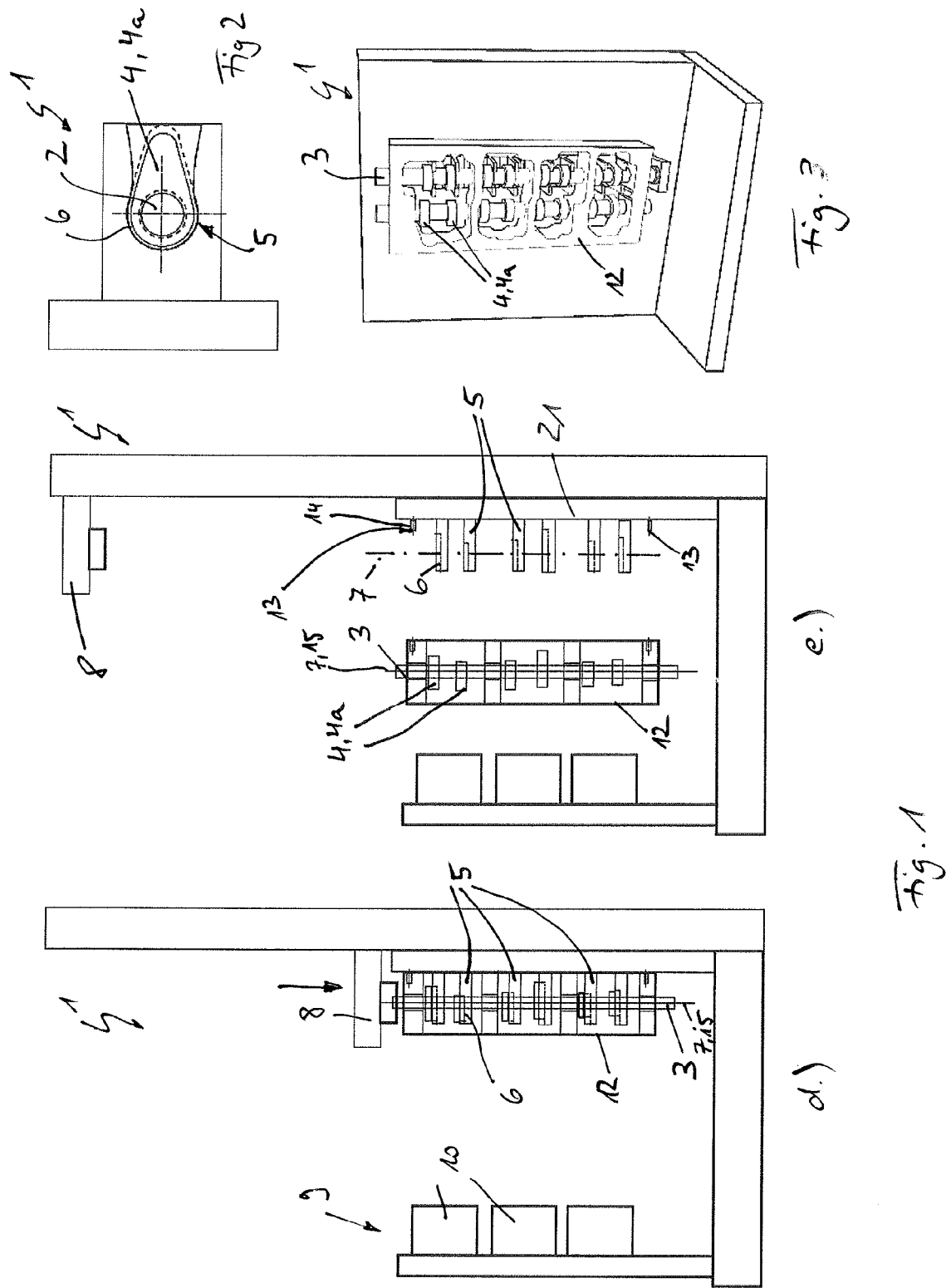

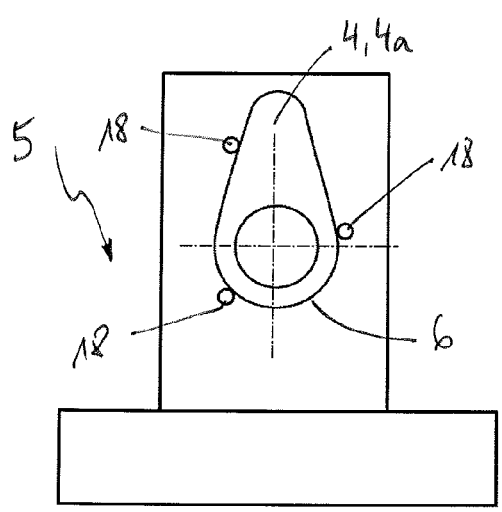
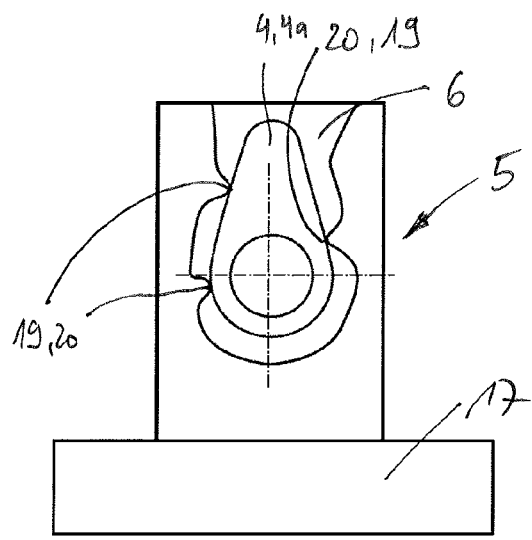
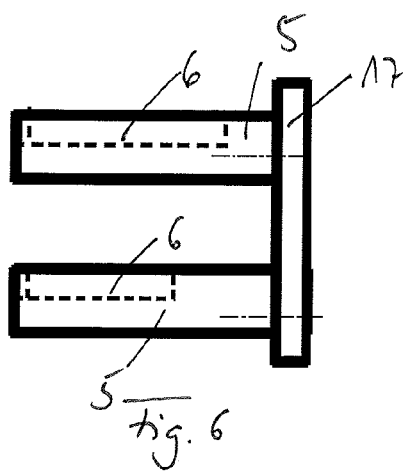
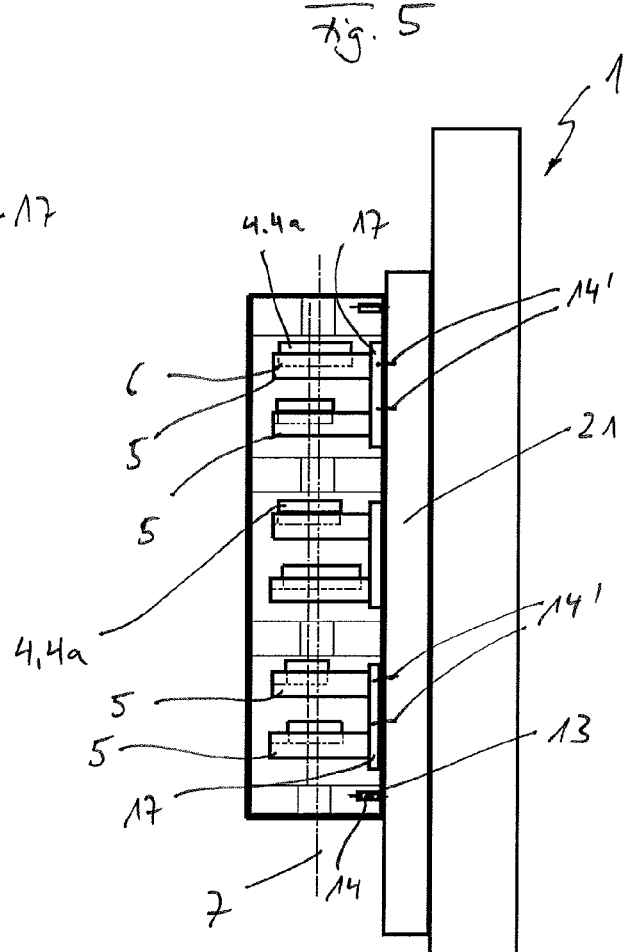
Fig. 4
Fig. 5
Fig. 6
Fig. 7

DEVICE FOR POSITIONING MULTIPLE FUNCTION ELEMENTS

CROSS-REFERENCE TO RELATED APPLICATIONS

This application claims priority to German Patent Application No. 10 2013 200 638.1, filed Jan. 17, 2013, the contents of which are hereby incorporated in their entirety.

TECHNICAL FIELD

The present invention relates to a device for positioning multiple function elements comprising a recess for a shaft, in particular cams, balancing masses, gear wheels and/or bearings. The invention additionally relates to a method for the thermal joining of a shaft with multiple function elements.

BACKGROUND

From DE 10 2008 064 194 A1 a generic device for positioning multiple function elements comprising a recess for a shaft, in particular cams, in a predetermined angle position on the shaft is known, wherein the device comprises multiple mountings each intended for a function element, which in each case are equipped with a moulding fixing the angle position of the respective function element corresponding to the angle position on the shaft. The mountings in this case can be positioned in such a manner that the recesses of the function elements lie on a common straight line. At least individual mouldings in this case comprise an adjustable angle position, as a result of which a correct positioning of the function elements can be simplified.

From DE 10 2007 056 638 A1 a further device for the assembly of a composite, consisting of at least one shaft carrying unsplit bearings is known, wherein the housing has positioning devices which prior to the joining hold the function elements in a predetermined phase position in the housing in such a manner that the at least one shaft can be pushed in through the bearings of the housing and openings in the function elements. The positioning device in this case is provided with recesses for the function elements, which have a stop, which supports the function element against the joining direction of the shaft, wherein the recess of the positioning devices have a part contour of the contour of the function elements as negative profile, so that the function elements can be held in phase position according to their joining position later on. The part contour of the recesses in this case engages about the function elements at least over a part of their outer contour. A particularly phase-accurate positioning is to be achieved through this. However, disadvantageous with the devices according to the invention is a comparatively complicated guiding of the shaft during the thermal joining process.

From DE 10 2009 060 350 A1 a device for the assembly of a shaft carrying function elements is known, wherein the device comprises a machine platform, on which a plurality of positioning discs for the aligned, correct positioning of the function elements is arranged in such a manner that a shaft can be pushed in. The positioning discs are reversibly fixed on a frame, which in turn is reversibly fixed on the machine platform. This is intended to make possible rapid changing of a production process by having available multiple frames.

SUMMARY

The present invention deals with the problem of stating an improved embodiment for a device of the generic type, which in particular significantly simplifies a thermal joining process.

According to the invention, this problem is solved through the subjects of the independent claims. Advantageous embodiments are subject of the dependent claims.

The present invention is based on the general idea of modifying a device for positioning multiple function elements comprising a recess for a shaft in such a manner that the individual function elements are attached in the device in vertical arrangement, so that a thermal joining of a shaft with the function elements can take place in vertical direction. Through the vertical joining, for example the pushing-in of the cooled shaft from the top into the function elements arranged vertically on top of one another, complex guiding of the shaft required up to now can in particular be omitted, since the guiding of the shaft is already mainly taken over by gravity. In the case of the devices known from the prior art, joining of the shaft with the function elements always takes place in horizontal direction, which requires a frequent and complicated supporting of the shaft during the joining process. The device according to the invention is suitable in particular for the joining of cams, balancing masses, gear wheels and/or bearings in a predefined angle position on the shaft, wherein the device comprises multiple mountings each intended for a function element, which in each case are equipped with mouldings in the manner of nests establishing the angle position of the respective function element corresponding to the angle position on the shaft. Here, the mountings for the individual function elements according to the invention are not only positioned in such a manner that the recesses of the function elements lie on a common straight line, but that this common straight line additionally runs substantially in vertical direction. The individual mountings are thus arranged on top of one another in the manner of balconies, wherein the mouldings in the respective balconies are formed in the manner of nests. In addition, the device according to the invention has a vertically moveable guide carriage for the shaft, with the help of which joining of the shaft with the function elements can take place in vertical direction and thus without the major guiding effort required up to now. The device according to the invention additionally has the major advantage that compared with the devices operating in horizontal direction known up to now, said device has a significantly smaller stand area so that on the same area more devices can be arranged.

In a further embodiment, the mountings can be provided with at least three pin elements which are arranged so that a function element is angle-accurately received. It is likewise conceivable to provide the mouldings with a contour surrounding the function element, which in at least three locations is formed so that a contact point with the function element is formed and the function element is angle-accurately received. This has the advantage of either having to only position at least three pins with great precision or produce a contour which only has to be finished with high precision in at least three locations. This brings substantial advantages in the production of the mountings and significantly lowers the costs.

Practically, a heating device is provided, by means of which at least two function elements can be heated in the mountings, in particular inductively. Here, the heating devices have induction coils, which according to a further advantageous embodiment of the invention are additionally activatable individually. By means of such heating devices, individual heating of the function elements can be achieved so that for example different function elements with individual heating requirement can be joined in one and the same device.

Practically, the mountings are at least partially formed of an inductively non-heatable material, for example of ceramic, so that a heating of the function elements in the mountings is not accompanied by a heating and thus expanding of the mountings at the same time. This in turn offers the major advantage that the function elements can be inserted at room temperature for example with little play in the associated moulding of the mountings and brace themselves in the mouldings only during the heating because of their heat expansions. If the mountings and thus also the mouldings were likewise formed of an inductively heatable material, these would likewise expand during the heating of the function elements, as a result of which under certain conditions the exact alignment of the function elements, which in particular in the case of cams on a camshaft is of decisive importance, would be lost.

The moulding of the mountings in this case has an at least partial negative contour of the function elements, so that the function elements can be angle-accurately received in the mouldings of the mountings. In addition, this negative contour can be matched to the outer contour of the function element to be received in such a manner that said function element at least at room temperature is received therein with little play. Because of this, in particular equipping the device with the function elements to be joined is particularly easily possible. In order to ensure exact fixing of the individual function elements in the mouldings of the mountings, it can be additionally provided that the negative contour is smaller by at least 10% of the heat expansion of the function element heated by means of the heating device in the heated function element. Because of this it is process-securely ensured that the function element can be fixed in the moulding securely and in the exact position.

Even if the mountings are at least partially produced from an inductively non-heatable material, it can happen in the production process after some operating time that the mountings are heated up. Because of this, the process-secure inserting, clamping and removing of the function element from the mounting can no longer be ensured under certain conditions.

Practically, a cooling of the mounting is therefore provided which makes it possible to hold the mounting at least in the region of the negative contour or of the moulding at a predetermined temperature that manifests itself during operation.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

Here it shows, in each case schematically,

FIG. 1a-e different method steps a.) to e.) for the thermal joining of a shaft in a device according to the invention for positioning multiple function elements comprising a recess for the shaft, FIG. 2 a view from the top onto a mounting for fixing the function element according to the invention, FIG. 3 a lateral view of the device according to the invention, FIG. 4 a mounting with three pins for fixing the function element, FIG. 5 a representation as in FIG. 4, however with three contact points for fixing the function element in the moulding of the mounting, FIG. 6 two mountings arranged on a platform, FIG. 7 a further embodiment of the device.

DETAILED DESCRIPTION

According to FIGS. 1a-e, 3 and 7, a device 1 according to the invention for positioning multiple function elements 4 comprising a recess 2 for a shaft 3 in a predetermined angle position on the shaft 3 comprises multiple mountings 5 intended for a function element 4 each. Within the individual mountings 5 formed balcony-like, mouldings 6 are provided in each case, via which the respective received function element 4, for example a cam 4a can be fixed with an angle position corresponding to the angle position of the respective function element 4, 4a on the shaft 3. By way of the moulding 6, angle-accurate aligning of the function element 4 and of the cam 4a relative to the shaft 3 thus takes place, which in particular in the case of camshafts is of decisive importance for the control of the valves of the internal combustion engine. The mountings 5 and thus also the mouldings 6 are arranged vertically on top of one another, wherein in the case of function elements 4 received in the respective moulding, their recesses 2 lie on a common, vertical straight line 7.

In addition to this, the device 1 according to the invention comprises a vertically moveable guide carriage 8 for the shaft 3, as a result of which joining of the shaft 3 with the function elements 4, 4a can take place in vertical direction. This offers the special advantage that the shaft 3 to be joined already aligns itself because of the gravity acting on it, so that a complicated alignment that was required up to now during the horizontal joining can preferentially be omitted entirely.

The mouldings 6 have an at least partial negative contour of the function elements 4, 4a, so that these can be positioned therein or are received therein angle-accurately and in particular in an accurately fitting manner. The negative contour in this case engages about the function elements 4 at least over a part of their outer contour. Here, the negative contour is matched to the outer contour of the function element 4 to be received, for example of the cam 4a, in such a manner that the function element 4 at room temperature is received therein with little play, as a result of which a particularly simple inserting and removing from the moulding is possible.

For thermally joining the shaft 3 with the function elements 4 a heating device 9 is provided, by means of which at least two of the function elements 4 can be heated, in particular inductively, in the respective mountings 5 and mouldings 6. For inductively heating the function elements 4, for example the cams 4a, the heating device 9 comprises at least two induction coils 10 which are in particular activatable independently of one another. Through the possibility of the individual activation of the individual induction coils 10 it is possible to join a wide range of function elements 4, for example cams 4a and gear wheels as well as bearings each with different heating requirements using one and the same device 1. Depending on the thickness of the individual function elements 4, these namely require different heating outputs or heating-up durations to reach the joining temperature. Additionally or alternatively, the shaft 3 can obviously also be cooled.

The negative mould is advantageously dimensioned in such a manner that on heating the function element 4 in the negative mould, i.e. the moulding 6, the heated cam 4a or the heated function element 4 is reliably and exactly fixed in the moulding 6.

In order to achieve bracing of the heated function element 4 in the moulding 6 of the mounting 5, the mounting 5 can be formed from an inductively non-heatable material, for example from ceramic.

It is preferentially provided that the negative contour is smaller by at least 10% of the heat expansion of the function element 4 heated by means of the heating device 9 than the heated function element 4, so that the heated function element 4 is braced and fixed in the negative contour. Despite all this, even such a mounting 5 formed from an inductively non-heatable material is heated with increasing production duration through the heat transfer from the heated function elements 4, so that it is practically provided to configure at least one of the mountings 5 coolable, as a result of which a process-secure inserting, clamping and removing of the function element 4 is made possible.

In modern combustion engines, the distances between two upright function elements 4 servicing a cylinder, in particular cams 4a, are often identical across manufacturers. For this reason, multiple mountings 5, in particular two mountings 5, are mounted on a common platform 17 in a particularly advantageous further development of the device 1. Since the distances are often the same, particular advantages are derived from this since identical parts can be employed, which can massively lower the costs. The at least two platforms 17 (see FIG. 7) are mounted on the device 1 in an aligned manner. Appropriate for this are positioning devices, such as fitted pins 14' or alignment elements which can be attached arranged in a fixed manner or reversibly on the device 1. The at least two platforms 17 in a further advantageous further development of the device 1 can be practically first assembled on a frame 21, which can then be assembled on the device 1 as a complete unit. Multiple frames 21 can be kept in stock and a rapid change to another camshaft type be completed in the production process. On the one hand this makes possible identical parts and a faster and more flexible change of the production environment.

In addition, the device 1 can comprise a holding device 11 for a bearing frame 12 for the shaft 3, wherein positioning of the bearing frame 12 relative to the device 1 takes place via at least two positioning elements 13, in particular fitted pins 14, in such a manner that a bearing gallery 15 of the bearing frame 12 is aligned with the recesses 2 of the individual function elements 4, so that the shaft 3 can be simply pushed through the recesses 2 of the function elements 4 about the bearing gallery 15 of the bearing frame 12 which is aligned to these.

According to the FIGS. 1a to 1e, the individual method steps a.) to e.) for the thermal joining of the shaft 3 with multiple function elements 4 comprising a recess 2 for the shaft 3, in particular cams 4a, balancing masses, gear wheels and/or bearings by means of the device 1 according to the invention are shown.

According to the first method step a.) shown in FIG. 1a, the function elements 4 or the cams 4a respectively are initially inserted angle-accurately in the mouldings 6 of the mountings 5 of the device 1 namely in such a manner that the recesses 2 of the individual function elements 4, 4a lie on a common substantially vertical straight line 7.

Following this, the shaft 3 is cooled and/or the function elements 4, i.e. the cams 4a, heated, for example by means of the previously mentioned heating device 9. This takes place in the method step b.).

In the method step c.), the bearing frame 12 is now fastened to the device 1 via the positioning elements 13, i.e. via the fitted pins 14, in such a manner that the bearing gallery 15 of the bearing frame 12 is aligned with the recesses 2 of the individual function elements 4.

Once this has taken place, the shaft 3 is pushed by means of the vertically moveable guide carriage 8 through the recesses 2 of the function elements and through the bearing gallery 15 of the bearing frame 12 from above, as is shown according to FIG. 1d and thus the method step d.). Following this, a temperature equalisation fixing the function elements 4 on the shaft 3 is awaited, during which the function elements 4 cool down and/or the shaft 3 is heated, so that the thermal joining fit between these two components can be established. In the method step e.), the shaft 3 including function elements 4 fixed thereon and additionally with the bearing frame 12 is subsequently removed from the device 1. Here it is obviously clear that the thermal joining of the shaft 3 with the individual function elements 4 can purely theoretically also take place without the bearing frame 12. In this case, the method step c.) would be omitted.

Considering the mounting 5 in FIG. 4, the latter there has three pin elements 18, which are arranged so that a function element 4, 4a is angle-accurately received. Alternatively to this, at least one moulding 6 can be provided with a contour surrounding the function element 4, 4a, which in at least three locations 19 is formed so that a contact point 20 with the function element 4, 4a is obtained and the function element 4, 4a is angle-accurately fixed, as is shown in FIG. 5. Through the points 19, an unambiguous position of the function elements 4, 4a in the mountings 5 is thus enforced. Obviously, the mouldings 6 can also have an at least partial negative contour of the function elements 4, 4a, so that these are angle-accurately received therein. Here, the negative contour is matched to the outer contour of the function element 4 to be received in such a manner so that the latter is received therein with little play at room temperature. Considering FIGS. 1, 3 and 7 it is additionally evident that at least four mountings 5 are arranged vertically on top of one another so that the common straight line 7 runs in vertical direction.

With the device 1 according to the invention and with the method according to the invention, the thermal joining of function elements 4 on shafts 3 can be clearly simplified since through the vertical joining a complicated alignment of the shaft 3 which was required up to now is now mainly taken over by gravity and need not therefore be elaborately performed manually. Obviously, the device 1 can nevertheless comprise individual guide element 16, for example as guide pins, for guiding the shaft 3 during the joining process.

The invention claimed is:

1. A device for positioning a plurality of receiving elements, each having a recess for receiving a shaft, in a predetermined angle position on the shaft, comprising:

a plurality of mountings for receiving a plurality of receiving elements, each mounting including a moulding defining an angle position of the respective receiving element corresponding to the predetermined angle position on the shaft, wherein the plurality of mountings are arranged such that the recesses of the plurality of receiving elements lie on a common straight line, wherein the plurality of mountings are arranged vertically on top of one another, so that the common straight line extends in a vertical direction, a vertically moveable guide carriage for the shaft, wherein the guide carriage is configured for joining the shaft with the plurality of receiving elements in the vertical direction, wherein at least one mounting of the plurality of mountings includes an inductively non-heatable material at least in a region of the moulding, and wherein at least one of:
  (i) at least one mounting includes at least three pin elements, and wherein the at least three pin elements are arranged on the at least one mounting to receive at least one receiving element in an angular-accurate position, and
  (ii) the moulding of at least one mounting includes a contour configured to surround at least one receiving element, and wherein the contour of the at least one moulding is profiled to include a protrusion in at least three locations each extending radially inwards towards the common straight line to define a contact point in the at least three locations with the at least one receiving element and orient the at least one receiving element in an angular-accurate position.

2. The device according to claim 1, wherein each of the plurality of mountings are composed of an inductively non-heatable material.

3. The device according to claim 1, wherein the shaft is connected to the plurality of receiving elements via a thermally joined fit in which at least one of the shaft is cooled and the plurality of receiving elements are heated.

4. The device according to claim 1, wherein the moulding of at least one other mounting has at least a partial negative contour of at least one receiving element so that the at least one receiving element is received in an angular-accurate position.

5. The device according to claim 4, wherein the negative contour of the moulding is matched to an outer contour of the at least one receiving element to be received therein such that the at least one receiving element is arranged in the moulding at room temperature with a predefine radial play with respect to the common straight line to account for a heat expansion of the at least one receiving element.

6. The device according to claim 5, wherein the negative contour of the moulding is smaller by at least 10% of the heat expansion of the at least one receiving element so that the at least one receiving element upon heating is braced and fixed in the negative contour.

7. The device according to claim 1, further comprising a heating device configured to heat at least two receiving elements in at least two mountings.

8. The device according to claim 7, wherein the heating device comprises at least two induction coils controllable independently of one another.

9. The device according to claim 1, wherein at least one mounting is coolable to adjust a temperature at least in a region of the moulding even when a heated receiving element is positioned in the mounting.

10. The device according to claim 1, wherein at least four mountings are arranged vertically on top of one another so that the common straight line runs in the vertical direction.

11. The device according to claim 10, wherein:
at least two mountings are arranged on a platform,
at least two such platforms are arranged on the device through at least two positioning elements, and
the common straight line extends vertically.

12. The device according to claim 1, further comprising a holding device for a bearing frame having a bearing gallery for mounting the shaft, wherein the bearing frame is positioned relative to the device via at least two positioning elements such that the bearing gallery of the bearing frame is aligned with the recesses of the plurality of receiving elements.

13. The device according to claim 12, wherein the positioning elements are fitted pins.

14. The device according to claim 1, wherein the plurality of receiving elements include at least one of cams, balancing masses, gear wheels and bearings.

15. The device according to claim 1, wherein the moulding of the at least one mounting has the contour configured to surround the at least one receiving element, the contour of the moulding profiled to have the protrusion in the at least three locations each extending radially inwards towards the common straight line to define the contact point in the at least three locations with the at least one receiving element and orient the at least one receiving element in the angular-accurate position.

16. The device according to claim 1, wherein the at least one mounting has the at least three pin elements arranged to receive the at least one receiving element in the angular-accurate position.

17. A method for thermally joining a shaft with a plurality of receiving elements each having a recess for the shaft via a positioning device comprising:
placing the plurality of receiving elements in a respective moulding of a plurality of mountings such that the recesses of the plurality of receiving elements lie on a common substantially vertical straight line, wherein the moulding of the plurality of mountings orients the plurality of receiving elements in an angular-accurate position,
heating the plurality of receiving elements,
pushing the shaft with a vertically moveable guide carriage through the recesses of the plurality of receiving elements,
fixing the plurality of receiving elements on the shaft via a temperature equalisation fixing, and
removing the shaft including the plurality of receiving elements fixed thereon from the device,
wherein at least one mounting of the plurality of mountings includes an inductively non-heatable material at least in a region of the moulding to limit a thermal expansion of the at least one mounting during the heating of the plurality of receiving elements, and
wherein at least one of:
  (i) at least one mounting includes at least three pin elements, and wherein the at least three pin elements are arranged on the at least one mounting to receive at least one receiving element in an angular-accurate position, and
  (ii) the moulding of at least one mounting includes a contour configured to surround at least one receiving element, and wherein the contour of the at least one moulding is profiled to include a protrusion in at least three locations each extending radially inwards towards the common straight line to define a contact point in the at least three locations with the at least one receiving element and orient the at least one receiving element in an angular-accurate position.

18. The method according to claim 17, wherein heating the plurality of receiving elements includes heating at least two receiving elements with at least two independently controllable induction coils.

19. A positioning assembly, comprising:
a shaft;
a plurality of receiving elements each having a recess for receiving the shaft in a predetermined angle position on the shaft; and
a positioning device including a plurality of mountings for receiving the plurality of receiving elements, the plurality of mountings each including a moulding configured to receive a receiving element in an angular-accurate position corresponding to the predetermined angle position on the shaft, wherein the plurality of mountings are arranged such that the recesses of the plurality of receiving elements are arranged on a common straight line, and the plurality of mountings are arranged vertically on top of one another so that the common straight line extends in a vertical direction;
wherein the positioning device includes a vertically moveable guide carriage for the shaft, the guide carriage configured for joining the shaft with the plurality of receiving elements in the vertical direction;
wherein at least one of:
at least one mounting includes a plurality of pin elements arranged about the common straight line to orient at least one receiving element in the angular-accurate position; and
the moulding of at least one mounting includes a contour configured to surround at least one receiving element, the contour profiled to include a plurality of protrusions each extending radially inwards towards the common straight line to define a contact point with the at least one receiving element and orient the at least one receiving element in the angular-accurate position.

20. The assembly according to claim 19, wherein the plurality of receiving elements include at least one of a cam, a balancing mass, a gear wheel and a bearing.

21. The assembly according to claim 19, wherein at least one mounting of the plurality of mountings is composed of an inductively non-heatable material at least in a region of the moulding.

* * * * *